Feb. 16, 1937. R. HILL 2,071,302
SOLID CARBON DIOXIDE CAKE FORMING MACHINE
Filed April 4, 1935 4 Sheets-Sheet 1
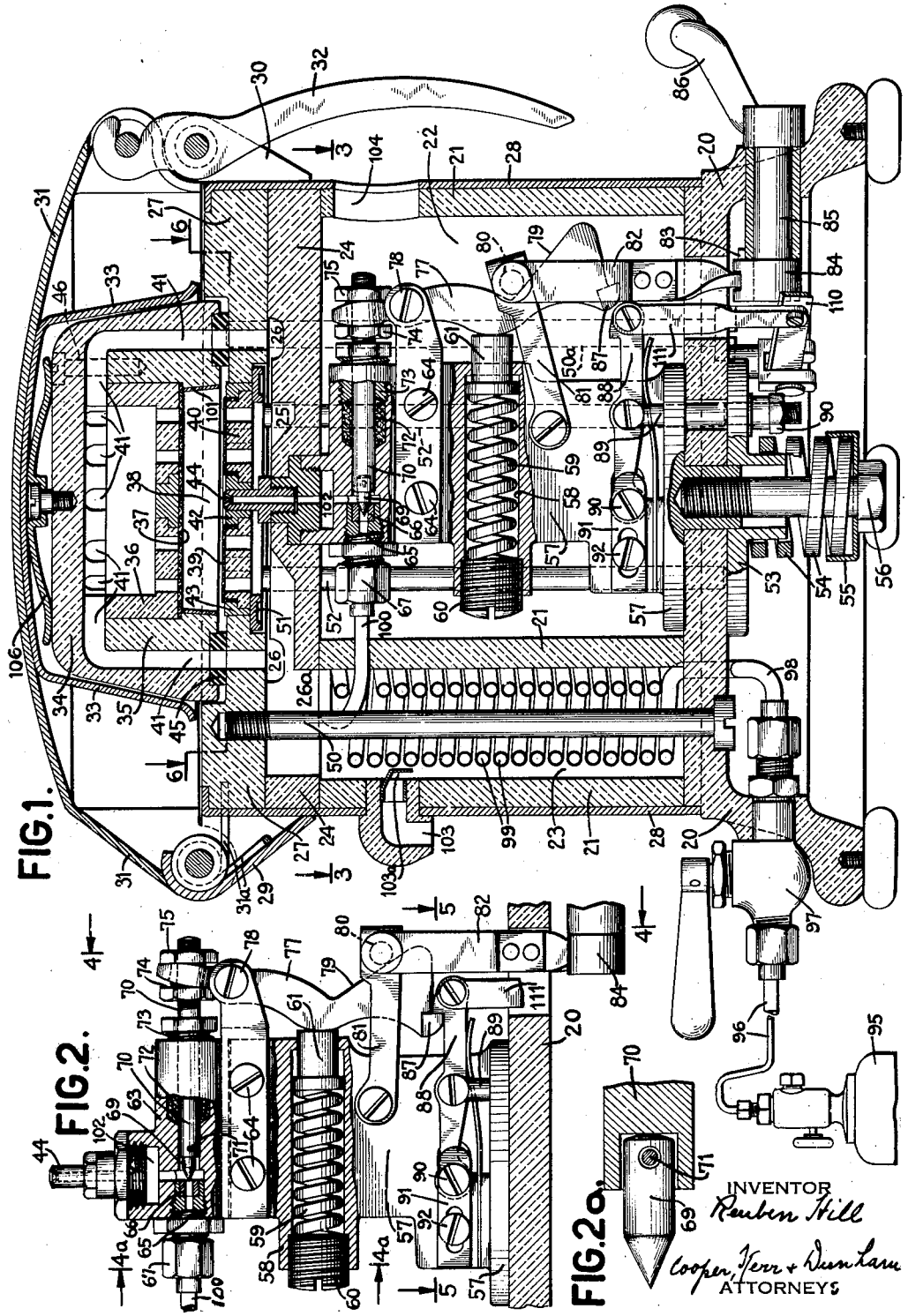
INVENTOR
Reuben Hill
Cooper, Kerr & Dunham
ATTORNEYS

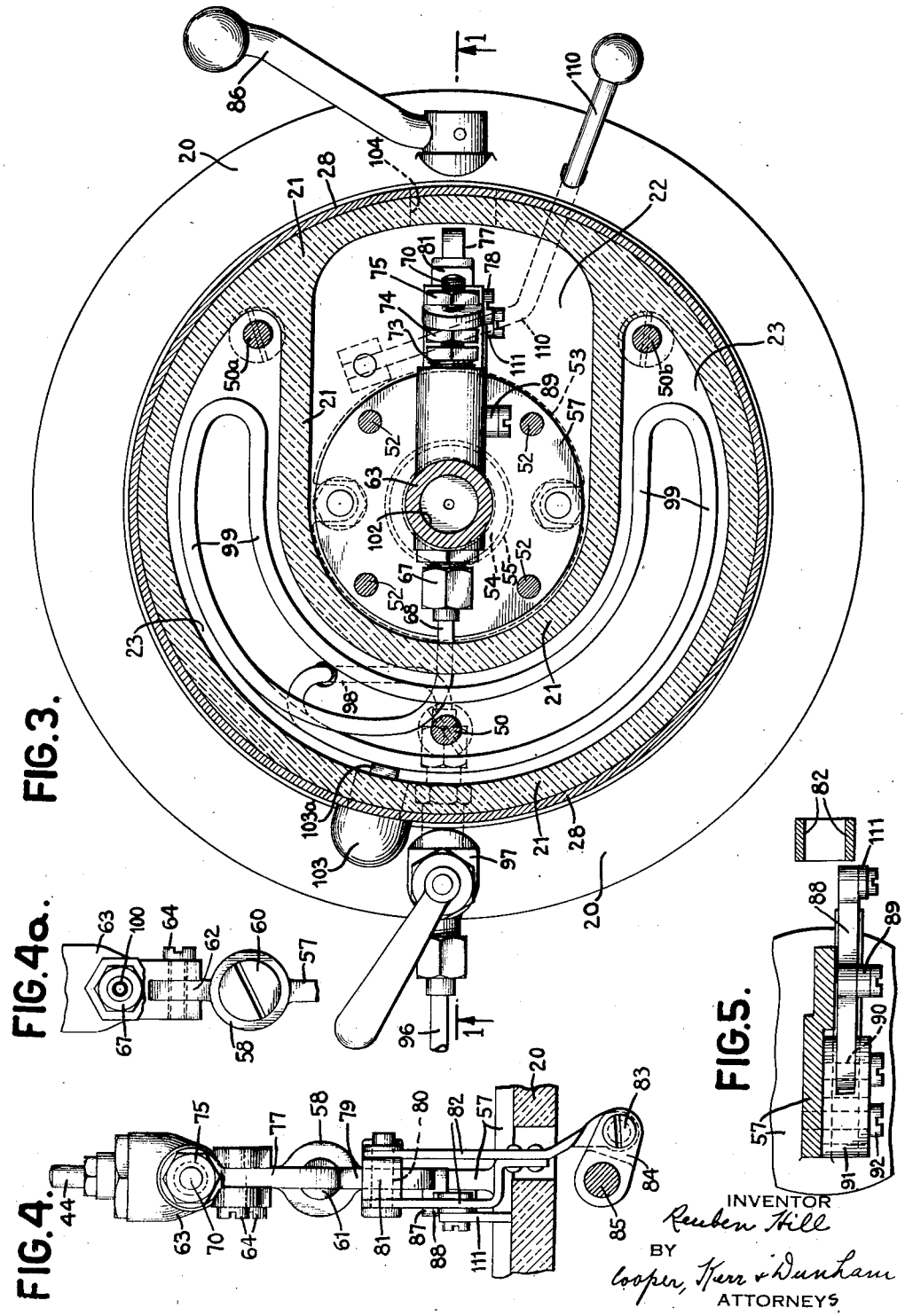

Feb. 16, 1937.  R. HILL  2,071,302
SOLID CARBON DIOXIDE CAKE FORMING MACHINE
Filed April 4, 1935  4 Sheets-Sheet 3
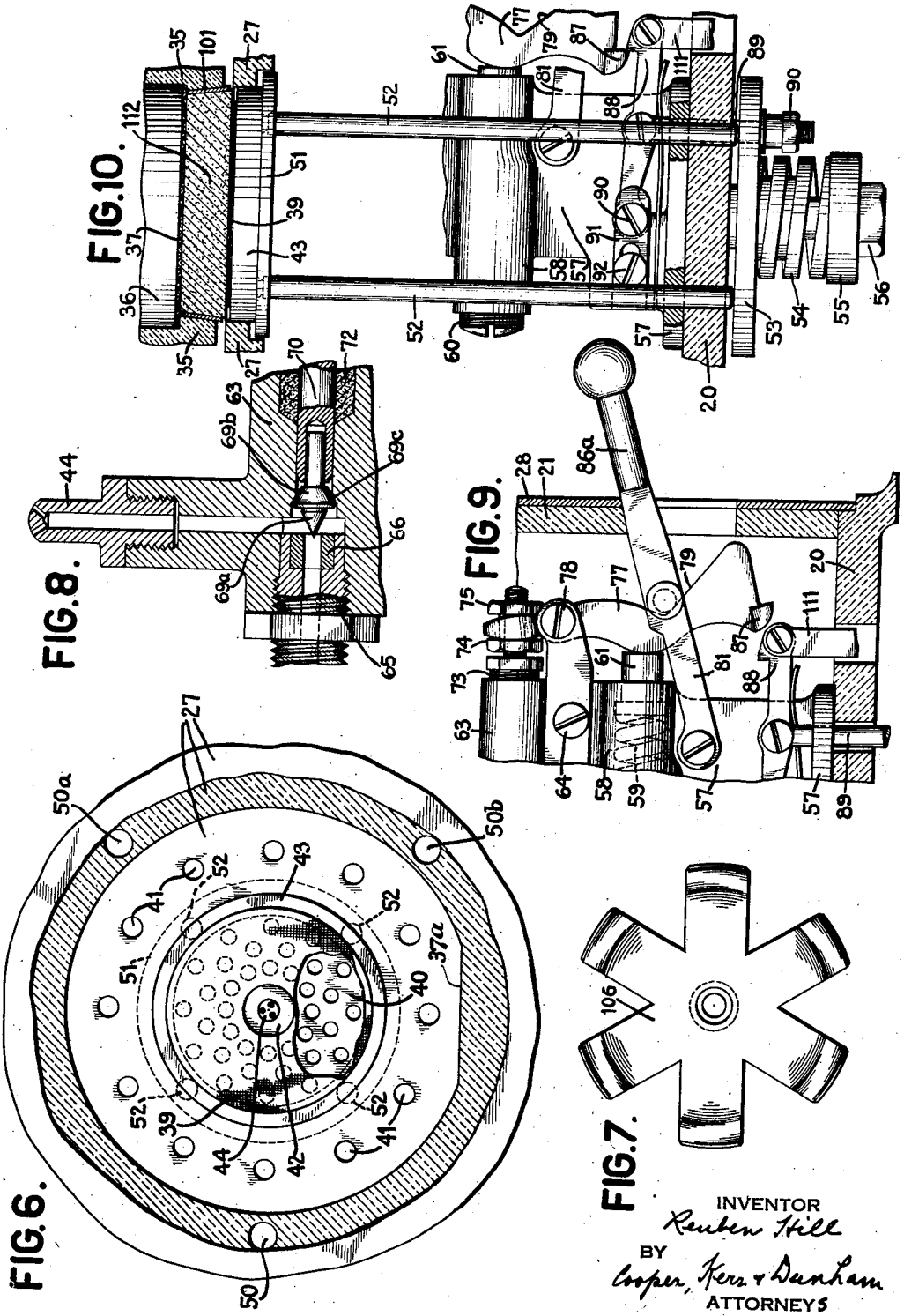
INVENTOR
Reuben Hill
BY
Cooper, Kerr & Dunham
ATTORNEYS

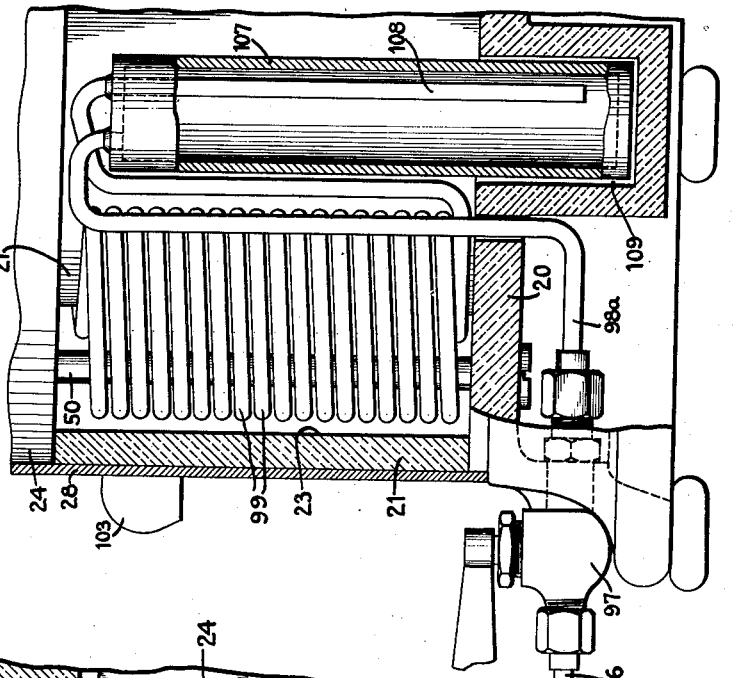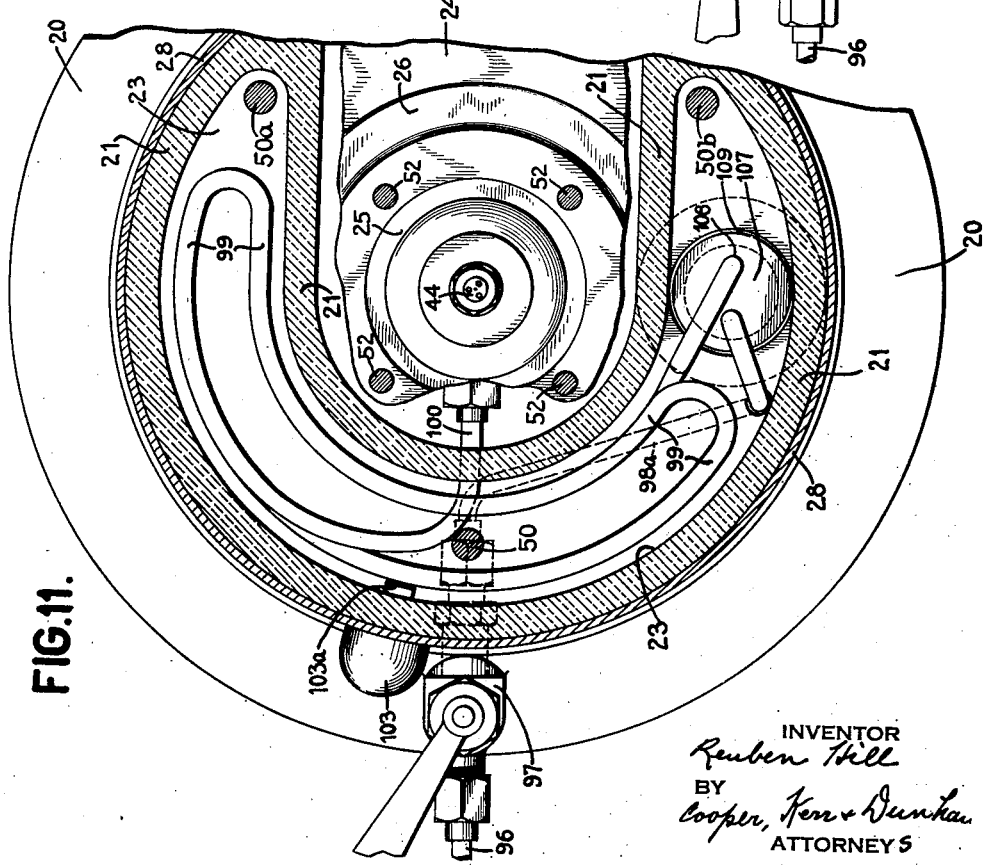

Patented Feb. 16, 1937

2,071,302

UNITED STATES PATENT OFFICE 2,071,302

SOLID CARBON DIOXIDE CAKE FORMING MACHINE

Reuben Hill, Detroit, Mich., assignor to Albert J. Smith, Richmond Hill, N. Y.

Application April 4, 1935, Serial No. 14,630

24 Claims. (Cl. 62—121)

This invention relates to an improved machine for making solid carbon dioxide cakes.

Previously, machines have been devised for this purpose, but such machines have not gone into extensive commercial use for various reasons. Such previous machines utilized the built up pressure attendant upon cake formation for automatically cutting off the liquid $CO_2$ supply but with such machines difficulty has been experienced in securing reliable action. The cost of the liquid $CO_2$ too is furthermore a material factor in the making of solid carbon dioxide cakes. With previous mehanisms, excessive quantities of $CO_2$ were required incurring excessive costs. In certain cases with certain machines explosion hazards were encountered.

The present invention has for its object the provision of an improved solid carbon dioxide cake making or forming machine in which improved results, better economy as to liquid $CO_2$ consumption and diminished hazards of operation may be secured.

Another object of the present invention resides in the provision of a mechanism for a machine of this class which will have extreme reliability and uniformity of operation.

Another object of the present invention resides in the provision of a solid carbon dioxide cake molding machine wherein provision is made for securing improved thermal efficiency in the molding operation itself.

Another object of the present invention resides in the provision of a solid carbon dioxide cake molding machine with provisions to conserve and utilize the generated cold to enhance the operating efficiency of the apparatus.

Another object of the present invention resides in the provision of a solid carbon dioxide cake molding machine wherein the operating and control mechanisms are effectively isolated from the effects of excessive cold whereby freezing up of the mechanism is prevented and whereby uniformity and reliability of operation is secured.

A further object of the present invention resides in the provision of a solid carbon dioxide cake molding machine in which rapid operations may be secured and more particularly rapid repeat operations wherein cake after cake is to be made in quick succession.

A further object of the present invention resides in the provision of a machine of the character described which is cheap to manufacture, easy to assemble and test, easy to adjust and repair, economical in operation and simple and easy to operate.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figure 1 is a transverse sectional view of the machine, the section being taken substantially on line 1—1 of Fig. 3;

Fig. 2 is a detail view of the valve mechanism shown in Fig. 1 with the valve in open position. This view also shows a modified form of conduit to the jet;

Fig. 2a is an enlarged detail view of the needle valve showing the floating mounting in the stem;

Fig. 3 is a transverse sectional view taken substantially on line 3—3 of Fig. 1;

Fig. 4 is a side view of the valve actuating linkage, the view being taken substantially on line 4—4 of Fig. 2 and looking in the direction of the arrows;

Fig. 4a is a sectional view showing the manner of securing the valve body to the valve base, the section is taken substantially on line 4a—4a of Fig. 2;

Fig. 5 is a sectional detail view of certain parts shown in Fig. 2, the section being taken substantially on line 5—5 of Fig. 2;

Fig. 6 is a detail sectional view showing the upper portion removed. The section is taken substantially on line 6—6 of Fig. 1;

Fig. 7 is a detail plan view of a spring element used to overlie the top of the mold;

Fig. 8 is a view of a modified form of needle valve;

Fig. 9 is a detail view of a modified form of operating mechanism for opening the valve;

Fig. 10 is a fragmentary detail view showing the manner of supporting the pressure plate and the manner of transmitting the downward pressure to the trip and spring plate;

Fig. 11 is a sectional view generally similar to Fig. 3, but of a modified form wherein a reduction chamber is employed; and Fig. 12 is a detail vertical sectional view showing the manner in which the reduction chamber is mounted and related to the cooling coil.

In more detail referring now particularly to Fig. 1, the machine is provided with a base plate portion generally designated 20 and preferably made of molded composition having low heat transfer characteristics. Mounted on the base 20 is an intermediate body section 21 also of molded heat insulating composition which constitutes a casing and is shaped to provide a valve chamber and a pre-cooling or cooling coil chamber. In Fig. 3 the configuration of the intermediate member 21 is more clearly shown. In this figure the valve chamber is shown at 22 and the coil chamber which is somewhat semi-circular or horseshoe shape in configuration is shown at 23. On the top of member 21 is superimposed an intermediate plate 24 also of molded heat insulating composition. The upper part of plate 24 is provided with vent ducts 25 and 26 which provide for the escape of gas during the formation of a cake of ice. The vent gases pass downwardly through an opening 26a into the coil chamber 23. On the top of the intermediate plate 24 is a mold supporting plate 27. The base 20, the member 21 and plates 24 and 27 are also secured together in any desired manner as by means of three holding down bolts, one of which is shown at 50 in Fig. 1. The other bolts are shown at 50a and 50b in Fig. 3. These holding down bolts secure the foregoing parts to the base 20. An outer metallic housing 28 may be provided preferably of sheet metal which centers the members 21, 24 and 27 with respect to the base 20. The outer housing 28 may be provided with a lug 29 to form a hinge support and another lug 30 to form a latch support. Such lugs 29 and 30 may be secured to the housing 28 in any desired manner as by spot welding or riveting the same thereto. The apparatus is provided with a hinged cover 31 to permit the removal of the mold. The cover may be secured in position by a cam lever handle 32. A spring 31a may be provided to swing open the cover when released. A cup-shaped locating member or shield 33 is provided, which is secured in any suitable way as by spot welding it to the cover 31. Within and spaced from member 33 is a built up mold which comprises an outer portion 34 made of molded composition and an inner portion 35 also of molded composition which is the mold proper. Carried by the inner portion 35 is a molded backing 36 for a screen 37, the screen constituting the upper wall of the mold. The mold cavity is shown at 38. The bottom wall of the mold cavity is defined by a screen 39 supported upon a perforated insulated mold backing 40. The member 36 is also preferably perforated and is likewise formed of insulating molded low heat transfer material. Suitable vent ducts 41 are provided intermediate member 36 and member 34 to vent the gas escaping through the upper wall of the mold cavity into the vent ducts 26. The mold member 34 is provided with a flat surface to key the mold to plate 27 in order to preserve alignment of the ducts 41. In Fig. 6 the keying surface of plate 27 is shown at 37a. The gas ecaping through the lower mold wall vents to the ducts 25. The lower mold screen 39 is securely held to member 40 by means of a bushing or thimble 42 and by an outer ring 43. The thimble 42 also serves as a guide to centralize the jet element 44. The jet element 44 snugly fits the thimble 42 to prevent undesired escape of gas around the periphery of the jet.

Ring 43 serves a like purpose to prevent unwanted escape of liquid or gas around the outer periphery of the screen 39. Intermediate the mold body 34 and the mold plate 27 is a suitable gasket 45 to prevent loss of liquid or gas into the atmosphere when the cake is being formed. The mold part 33 is preferably secured to the mold part 34 by a plurality of screws, one of which is shown at 46. All of the mold body parts, viz. 34, 35, 36, and 39 are made of molded composition having low heat transfer characteristics. This construction retains the generated cold within the mold and materially enhances the efficiency of the apparatus and materially speeds up the formation of a cake of dry ice. It also enhances the snow formation.

Pressure plate and support therefor

Referring to Fig. 1 the annular member 43 is vertically slidable with respect to the mold plate 27. Disposed below part 43 and below the periphery of the part 40 is a pressure plate 51. This pressure plate 51 is supported on four vertical push rods or posts 52, two of which are shown in Fig. 10. Fig. 11 also shows the four rods 52. These push rods can be secured in any desired manner to the pressure plate 51 as by riveting the same thereto. The push rods 52 extend downwardly through the valve chamber 22 and pass through openings in the base 20 and abut against and are supported by a trip and spring plate 53.

Supporting the spring and trip plate 53 is a coil spring 54. The lower end of the spring 54 is received in a cup 55 (Figs. 1 and 10) and the spring tension may be adjusted at the time of assembly or subsequently by means of a cap screw 56 which is threaded into a boss on the valve base 57.

It will be noted the main spring 54 is wholly below the heat insulating bottom plate 20. The plate 20 prevents heat transfer from the cooling chamber 23 to the spring. The spring is accordingly maintained at room temperature and keeps its original calibration and flexibility characteristics.

Valve construction

The valve construction will now be described with particular reference to Figs. 1 and 2. The valve base 57 is extended upwardly and provided with a socket 58 for receiving a coil spring 59. The coil spring at one end abuts against an adjustment screw 60 and at the opposite end against a pressure plunger 61. Above the spring socket the valve base is provided with a tongue portion 62 best shown in Fig. 4a, which supports a valve body casting 63. Suitable screws 64, Fig. 2, secure the valve body to the valve base. A fitting 65 receives a non-corrosive valve seat 66 and also receives a coupling 67 for tank pipe 100. A floating needle valve 69 is carried in stem 70 and in floating relation thereto (see Fig. 2a). It may be secured to the stem by any suitable means such as a pin 71. The stem 70 is provided with suitable packing 72 cooperating with packing gland 73. The outer end of the stem is threaded to receive a spool 74 and the spool is secured in position by means of a nut 75. It will be understood that the position of the spool 74 can be adjusted on the stem 70. In this way proper travel can be provided for the needle valve 69. Extending in cooperation with the spool 74 and nut 75 is a valve operating cam link 77. This cam link is pivoted at 78 to the valve body. The cam link 77 has a portion abutting the plunger 61 so that the compression spring 59 will act to close the valve. The cam plate is provided with a cam surface 79 cooperating with a hardened stud 80 for opening the valve upon the rocking of the cam plate. Stud 80 is carried by a shackle 81 which is pivoted to the valve base. The stud 80 is likewise connected to a shackle linkage 82, see also Fig. 4, which shackle linkage pivotally connects at 83 to a bell crank arm 84 fixed to rock shaft 85. The rock shaft 85 is carried in a bearing in the base and at its outer end carries an operating handle 86. Also secured to the cam plate 77 (see Fig. 2) is a sear member 87 adapted to cooperate with a spring pressed sear link or latch 88. It will be understood that upon operating the handle 86 the cam plate 77 (Fig. 2) will be rocked clockwise thus opening the valve 69 and that the sear 87 and latch 88 will hold the valve open. To trip the sear latch 88, a link 89 is provided which extends through the base 20 (see Fig. 1) and through the trip and spring plate 53. The lower end of this link 89 is provided with an adjustment screw 90. It will be understood that when a cake of ice is completed in the mold cavity 38 that ultimately a downward pressure will be exerted which will in turn press downwardly upon the spring and trip plate 53 and that this action will ultimately draw downward the sear latch 88 through link 89 and trip the cam plate 77. Thereafter the spring 59 will close the valve. It is desirable to provide an adjustment for the sear latch 88 and this may conveniently be provided for by adjusting the pivot point of the sear latch. Referring to Fig. 5, 90 is the pivot for the sear latch 88 and such pivot is carried by a block 91 which is slidably adjustable with respect to the valve base 57. A suitable screw 92 locks the block 91 in any desired position.

It will be understood that the pressure which is built up in the mold cavity by snow formation will increase when the cake is completed and such pressure will be sufficient to compress the spring 54 to such an extent as to cause the tripping of the latch with the attendant automatic closure of the valve. Dangerous pressures in the mold cavity are avoided and by the adjustments the tripping point can be so regulated as to avoid a waste of carbon dioxide.

Referring again to Fig. 1, liquid carbon dioxide preferably admixed with a suitable chemical deterrent is received from commercial supply tank 95 through pipe 96 and through emergency shutoff valve 97. From the emergency shutoff valve 97 conduit 98 leads through the base 20 to pre-cooling coil 99. From the pre-cooling coil a conduit connection 100 extends to the valve through coupling 67.

Assuming that a cake of dry ice is to be molded, the cover 31 is first opened by releasing the cam latch 32. The cover then swings back under the spring action of spring 31a exposing the mold body 34. The upper mold body, which includes the assemblage of 34, 35, 36, and 37 is then removed and a paper ring 101 is inserted in the mold cavity at the periphery. Thereafter the upper mold assemblage is replaced on plate 27 and the cover is swung downwardly and relatched in position by the latch 32. The operator then actuates the handle 86, opening the valve and latching the valve open by the sear latch. Liquid carbon dioxide then flows upwardly through the jet 44, escaping into the mold cavity. As shown in Figs. 1 and 4 a chamber is provided at 102 beyond the needle valve. Temperature reduction occurs at the point of entrance from the chamber 102 into the duct leading to the jet 44. Temperature reduction also occurs at the jet itself. The escaping liquid expands within the mold cavity very rapidly, the temperature is lowered and snow particles are formed which collect upon the walls of the mold cavity. The vented gases escape through the conduits 25 and 26 and pass into the coil chamber 23 and cool the coil 99 therein and the $CO_2$ passing through the coil. The gases ultimately vent out of the gas chamber through the vent 103. To prevent the cold gases from directly venting through duct 103, a baffle 103a is provided which directs incoming gases downwardly away from the vent. The vent gases being $CO_2$ and relatively cold descend to the bottom of the cooling chamber and rise gradually as they absorb heat from the cooling coil and the $CO_2$ therein. This action further enhances the efficiency of the apparatus. Ultimately a cake of dry ice collects in the mold cavity and when this cake is completed the pressure builds up and trips the valve so it closes automatically.

It will be understood that the entire valve assemblage is in the valve chamber 22 which is substantially at room temperature. A suitable port 104 may be provided into the valve chamber. In this manner excessively low temperatures are avoided in and around the needle valve itself and the needle valve operation is made more reliable and exact than heretofore. The various trip rods for the valve and the spring 59 are maintained at room temperature and are prevented from changing in length, etc. The travel of the parts and tripping actions thereof are maintained substantially constant with attendant reliability and economy of operation. The valve closure action is rapid and sure and not affected by the cold conditions in the mold cavity.

It will furthermore be appreciated that the mold cavity itself is effectively heat insulated, thereby obviating the conduction of cold to the valve assemblage and the loss of heat from the mold cavity itself. In this way the efficiency of the apparatus is enhanced. Efficiency is further enhanced by cooling the entering liquid through the coil 99, since the vent gases are at relatively low temperature and in leaving the apparatus pass first downwardly in the cooling chamber 23 and then upwardly leaving the cooling chamber at the top.

The area of the duct through valve seat 66, the travel of the needle valve 69 from the seat, the area of the vertical duct to the jet and the total area of the three orifices of the jet itself are coordinated and related to each other to provide a metering system to meter the flow of the liquid $CO_2$ into the mold cavity. These are all proportioned to the cubical capacity of the mold cavity itself. In practice for a mold cavity of 2.7 cubic inches I have found that the area of the opening through the valve seat should be .00305 sq. inch, the travel of the needle should be ⅛ of an inch, the area of the vertical duct should be .01227 sq. inch, and the total area of the three orifices should be .00072 sq. inch.

Referring now to Figs. 1 and 7, it will be noted that a multiple leaf spring 106 is provided which is secured by a screw to the mold body 34. The spring 106 is preferably arranged to slide on the upper unthreaded portion of the screw. The purpose of this spring construction is to provide a form of safety valve. In the event of excessive pressures building up in the mold cavity instead of there being a possibility of an explosion which tears off the top cover 31, the upper part of the mold will rise allowing the excessive gas pressures to escape past the gasket face directly to the atmosphere.

Referring now to the modification shown in Fig. 9, in this figure a different operating means is provided for manually operating the valve. In lieu of the link connections 82, 83, 84, 85 and 86 the shackle 81 is extended directly through the side of the case and provided with the handle 86a.

Referring now to Fig. 8, in this figure a modified form of needle valve is provided. The non-corrosive seat 66 is retained as heretofore. A floating needle valve element 69a is provided with a reverse or rear portion 69b cooperating with a seat 69c so that when the valve is open the needle valve will prevent escape of liquid backward along the stem of the needle valve. The valve is seated against the supplemental seat by the pressure of the entering liquid. This needle valve structure floats in a socket in the stem 70. It will be understood that the needle valve 69a is forced into cooperation with the seat 66 by thrusting the stem 70 to the left.

Referring now to the modification shown in Figs. 11 and 12, in these figures, the conduit 98a leading from the emergency shutoff valve 97 in place of directly extending to the coil 99 extends upwardly and into the top of a closed cylinder 107. This cylinder serves as a reducing chamber for the gases which leave the cylinder. These gases leave via pipe 108, which is open adjacent the bottom of the cylinder. The pipe 108 leads to the cooling coil 99 and through the apparatus in the path previously traced. The reduction chamber or cylinder 107 is preferably disposed within the cooling chamber 23, the base 20 being provided with a recess 109 to receive the bottom of the cylinder. By this arrangement, pre-cooling of the entering medium is considerably enhanced. By the use of the supplementary cylinder 107 it is possible to materially diminish the dimensions of the cooling coil 99 and enhance the efficiency of the apparatus.

In some cases an operator of a machine may desire to close the main valve prior to the automatic closing of the valve by the pressure action of the machine. Such closure can be effected by means of a trip lever 110 shown with its end broken away in Fig. 1. Such trip lever 110 extends through an opening through the base of the machine to an accessible position. This trip lever 110 is provided with a link 111 which extends upwardly and is connected to the sear latch 88. By merely depressing the lever 110 the sear latch may be tripped and the valve can be tripped closed independently of the automatic tripping action as heretofore described.

Fig. 10 shows the cake of dry ice at 112 completely formed and filling the mold cavity. This view also shows the spring and trip plate 53 in depressed position with the trip latch 88 just ready to trip off the sear 87 on cam link 77.

While I have shown in Fig. 2 and Fig. 1 the chamber 102 from which the liquid $CO_2$ flows to the jet through a metering duct of reduced cross-section so that cold is produced at the point of entrance of the duct, such chamber is not essential but it is preferable to use it. In Fig. 8 such chamber is eliminated.

What I claim is:

1. A solid carbon dioxide cake molding machine having a casing and a mold into which $CO_2$ is introduced under pressure, a valve mechanism within said casing for controlling the supply of $CO_2$ to the mold, means for moving said valve mechanism upon the building up of pressure conditions in the mold, and means for thermally isolating the said valve mechanism from the cold produced in the mold and from the cold of the vent gases leaving the mold.

2. A solid carbon dioxide cake molding machine including a mold into which $CO_2$ is introduced under pressure, a valve mechanism for controlling the supply of $CO_2$ to the mold, a resilient means for controlling the operation of the valve mechanism upon building up of pressure in the mold upon completion of the cake therein to cause closure of the valve, and means for thermally isolating the resilient means from the effects of the cold in the mold for the purpose described.

3. A solid carbon dioxide cake molding machine having a casing and a mold into which $CO_2$ is introduced under pressure, a valve mechanism within said casing for controlling the supply of $CO_2$ to the mold, and means for thermally isolating the valve mechanism from the cold produced in the mold and from the cold of the vent gases leaving the mold.

4. A solid carbon dioxide cake molding machine including a valve, resilient means for causing movement of said valve, and means operated by a building up of excess pressure for releasing said resilient means, said resilient means being isolated from the influences of cold produced in molding the cake.

5. A solid carbon dioxide cake molding machine having a casing and a mold into which refrigerant is introduced under pressure, a valve mechanism within said casing for controlling the supply of refrigerant to the mold, heat insulation portions around the mold at the top, bottom, and sides to prevent the dissipation of cold therefrom, and means for thermally isolating said valve mechanism from the cold produced in the mold and from the cold of the vent gases leaving the mold.

6. A solid carbon dioxide cake molding machine having a casing and a mold into which liquid refrigerant is introduced under pressure, valve means within said casing for controlling the supply of such refrigerant, means for moving said valve mechanism upon the building up of pressure conditions in the mold, and a barrier having low heat transfer characteristics between the mold and the aforesaid valve means to keep the cold of the cake within the mold from influencing the action of the aforesaid valve means.

7. A solid carbon dioxide cake molding machine comprising a mold section, a valve section and a pre-cooling section, and means including intermediate complete barrier and complete housing portions having low heat transfer characteristics for separating said sections for the purpose described.

8. In a solid carbon dioxide cake molding machine including a mold into which $CO_2$ is introduced under pressure and comprising a housing provided with thermally insulated portions substantially wholly surrounding the mold cavity and thermally insulated portions dividing the housing into a pre-cooling chamber and a valve chamber, passages in said portions for receiving gases leaving the mold and for directing said gases into the pre-cooling chamber, and means for preventing cold gases entering the valve chamber.

9. A solid carbon dioxide cake molding machine including a mold having a cavity into which $CO_2$ is directed under pressure, a valve mechanism for controlling $CO_2$ supply and shutting off such supply upon completion of the cake forming operation, said valve mechanism comprising a needle valve, a camming member cooperating with a spring pressed member for closing the valve, manually operated means cooperating with the camming member for rocking the same to open the valve and a sear latch cooperating with the camming member to latch the valve in open position.

10. The invention set forth in claim 9 in which means is provided for adjusting the relation of the needle valve with respect to the camming member.

11. The invention set forth in claim 9 in which means is provided for adjusting the action of the sear latch with respect to the camming member.

12. A solid carbon dioxide cake molding machine including a mold having a mold cavity into which $CO_2$ is introduced under pressure and in which cavity a cake is formed, means comprising restricted ducts and a jet for metering the rate of flow into the mold, valve means to open and shut off the $CO_2$ supply to the mold, means to adjust the extent of valve opening of the valve means, means to latch the valve in open position, and means to adjust the tripping action of the latching means with respect to the pressure conditions in the mold cavity to rapidly unlatch the valve means upon completion of cake formation whereby the valve may rapidly close.

13. A solid carbon dioxide cake molding machine including a mold having a mold cavity into which $CO_2$ is introduced under pressure for cake formation therein, said mold having a bodily displaceable wall portion, a valve chamber, a spring supported member thermally isolated from the mold and from the valve chamber, means comprising a plurality of supports extending through the valve chamber for communication of the wall displacement to said member, and valve means controlled from said member and in the valve chamber to shut off $CO_2$ supply into the mold.

14. A solid carbon dioxide cake molding machine comprising a casing, a mold supporting plate of heat insulating material in said casing, a mold section with certain parts carried by the plate and other parts guided by the plate for displacement with respect thereto, said plate thermally insulating the mold from the casing and preventing the freezing up of the displaceable parts.

15. A solid carbon dioxide cake forming machine with a mold having a cavity into which $CO_2$ is introduced under pressure, means for pre-cooling $CO_2$ flowing to the mold, said means comprising a pre-cooling chamber receiving vent gases from the mold with a cooling coil and reduction chamber means in said pre-cooling chamber cooperating to effect cooling of the entering $CO_2$.

16. A solid carbon dioxide cake forming machine including a mold having a mold cavity into which $CO_2$ is introduced under pressure, valve means for controlling and metering $CO_2$ supply to the mold, said valve means comprising a needle valve with a cooperating stem and a supplemental valve to prevent escape of liquid $CO_2$ along the stem when the first mentioned needle is open.

17. A solid carbon dioxide cake forming machine including a mold having a cavity into which $CO_2$ is introduced under pressure, means for controlling $CO_2$ supply thereto, said means comprising a system of metering ducts leading from a needle valve and to a jet, one of said ducts extending to the jet also extending into an enlarged chamber whereby cold is produced at the point of entry into the duct from the chamber.

18. A solid carbon dioxide cake molding machine including a mold in which the cakes are formed and into which $CO_2$ is introduced under pressure, valve means for controlling the supply of $CO_2$ to the mold, said valve means being disposed in a valve chamber which is blocked against the entrance of the cold vent gases from the mold by partitioning means of heat insulating composition, which wholly block access of vent gases thereinto and also thermally insulate the valve means from the effects of such gases, means for controlling the tripping of the valve means including a spring which is flexed under pressure effects built up in the mold, and means for keeping the cold of the mold and the cold of the vent gases emerging therefrom from affecting the calibration of such spring, said last named means comprising insulating partitioning members including the previously recited partitioning means and a supplemental partitioning means of heat insulating composition between the valve chamber and the aforesaid spring.

19. A solid carbon dioxide cake molding machine including a mold into which $CO_2$ is introduced under pressure with means for enhancing the operating economy of the machine in cake molding operations, comprising heat insulating portions around the mold at the top, bottom and sides thereof to prevent the dissipation of cold therefrom and the conduction of heat thereto, said top and bottom mold defining portions comprising perforated plates of heat insulating composition affording support for mold screens, means receiving relatively cool vent gases from the mold with provisions for pre-cooling the $CO_2$ flowing to the mold, and a valve chamber thermally isolated from the mold and from the pre-cooling means by partitioning means of heat insulating composition, said partitioning means wholly blocking the flow of cold vent gases from the mold into the valve chamber, and valve means in said valve chamber for controlling $CO_2$ supply to the mold.

20. A solid carbon dioxide cake molding machine comprising a thermally insulated mold, valve means for controlling $CO_2$ supply thereto, a pre-cooling chamber with means for pre-cooling $CO_2$ enroute to the mold, partitioning means defining the walls of the valve chamber comprised of heat insulating composition and wholly blocking all entrance of cold vent gases into the valve chamber from the mold and pre-cooling chamber whereby such valve means in such chamber are not directly subject to the cold of such gases, and means for directing vent gases emerging from the mold into the pre-cooling chamber.

21. A solid carbon dioxide cake molding machine comprising a mold section, a pre-cooling section and a valve section including a valve chamber, valve means in the valve chamber in the valve section to control $CO_2$ supply to the mold section, means to wholly prevent cold vent gases from the mold from entering the valve chamber and to prevent the cold of such gases from effecting the operation of the valve means in said chamber, said means comprising a partition of heat insulating material between the valve chamber and the pre-cooling section and partitioning means of heat insulating composition between the valve chamber and the mold chamber, said latter partitioning means affording heat insulation for the valve chamber against the effects of cold of the vent gases and diverting such gases to the pre-cooling section.

22. A solid carbon dioxide cake molding machine comprising mold, valve and pre-cooling sections, each in a separate chamber and with the mold chamber in communication with the pre-cooling chamber to deliver vent gases from the mold thereinto, valve means in the valve chamber for controlling $CO_2$ supply to the mold chamber, and means to block access of cold gases to the valve chamber from the mold chamber and the pre-cooling chamber which comprises partitioning means of heat insulating composition which partitioning means are arranged to prevent the cold of emerging gases affecting the action of the valve means in the valve chamber.

23. A solid carbon dioxide cake molding machine comprising a pre-cooling section and a mold section having a mold cavity faced by screen parts into which $CO_2$ is introduced under pressure, said mold section having the screen parts thereof supported by a plate of heat insulating composition, a second plate of heat insulating composition with means therein to receive vent gases escaping from the mold and to direct the same into the pre-cooling section, a valve chamber below said second plate, said second plate preventing cold gases in the pre-cooling section from entering said valve chamber and also thermally insulating said valve chamber.

24. A solid carbon dioxide cake forming machine having a casing including a mold section, a precooling section, and a valve and control section including movable operating mechanism, means thermally isolating the valve and control section with its movable operating mechanism from the cold in the mold section and the cold in the precooling section, whereby the cold of cake formation is prevented from influencing the operation of and control of the valve mechanism, said valve and control section being open to the atmosphere so as to be maintained at atmospheric temperature, whereby reliability of operation of the valve mechanism disposed therein is secured.

REUBEN HILL.